United States Patent
Kristof et al.

(10) Patent No.: US 9,994,113 B2
(45) Date of Patent: Jun. 12, 2018

(54) DEVICE FOR THE CONTACTLESS CHARGING OF AN ELECTRICAL ENERGY STORAGE MEANS OF A MOTOR VEHICLE

(71) Applicant: Dr. Ing. h.c. F. Porsche Aktiengesellschaft, Stuttgart (DE)

(72) Inventors: Thomas Kristof, Karlsruhe-Palmbach (DE); Dirk Herke, Kirchheim unter Teck (DE); Marina Ueffing, Stuttgart (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 172 days.

(21) Appl. No.: 15/069,035

(22) Filed: Mar. 14, 2016

(65) Prior Publication Data

US 2016/0288656 A1    Oct. 6, 2016

(30) Foreign Application Priority Data

Mar. 30, 2015    (DE) .................. 10 2015 104 858

(51) Int. Cl.
| | |
|---|---|
| *H02J 7/00* | (2006.01) |
| *B60L 11/00* | (2006.01) |
| *B60L 11/18* | (2006.01) |

(52) U.S. Cl.
CPC ........... *B60L 11/182* (2013.01); *H02J 7/00* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ...... H02J 7/00; B60L 11/182; Y02T 10/7005; Y02T 10/7241

USPC ........................................ 320/108, 109, 104
See application file for complete search history.

(56) References Cited

U.S. PATENT DOCUMENTS

| | | | | |
|---|---|---|---|---|
| 5,426,363 A | * | 6/1995 | Akagi | ............... G01V 3/107 324/207.17 |
| 5,550,452 A | * | 8/1996 | Shirai | ............... H01F 38/14 320/108 |
| 5,850,135 A | * | 12/1998 | Kuki | ............... B60L 11/1805 320/108 |
| 6,011,457 A | * | 1/2000 | Sakamaki | ............... H01F 38/12 123/634 |
| 8,319,474 B2 | | 11/2012 | Mitake et al. | |

(Continued)

FOREIGN PATENT DOCUMENTS

| | | |
|---|---|---|
| JP | 2012055096 A | 3/2013 |
| WO | 2012/079668 | 6/2012 |
| WO | 2014/114762 | 7/2014 |

*Primary Examiner* — Phallaka Kik
(74) *Attorney, Agent, or Firm* — Gerald E. Hespos; Michael J. Porco; Matthew T. Hespos

(57) ABSTRACT

A device (1) for contactless charging of an electrical energy storage (2) of a motor vehicle that has a height adjustable chassis. A primary coil (3) is arranged in a bottom housing (4) on a surface on which the motor vehicle will be parked. The primary coil (3) is connected to an electrical power supply and will induce an alternating electrical voltage in a secondary coil (6) on the vehicle for charging the electrical energy storage (2). The primary coil (3) is connected to the bottom housing (4) by a spring (8, 9) that will compress under the effect of an external compressive force that may occur if the chassis is adjusted too low, thereby avoiding damage to either of the coils (3, 6).

7 Claims, 1 Drawing Sheet

(56) References Cited

U.S. PATENT DOCUMENTS

| | | | |
|---|---|---|---|
| 9,701,212 B2* | 7/2017 | Baarman | B60L 11/182 |
| 2011/0006611 A1* | 1/2011 | Baarman | H01F 38/14 |
| | | | 307/104 |
| 2012/0025761 A1 | 2/2012 | Takada et al. | |
| 2012/0203410 A1 | 8/2012 | Weehlin et al. | |
| 2013/0304298 A1 | 11/2013 | Baier et al. | |
| 2015/0287527 A1* | 10/2015 | Kasar | H01F 38/14 |
| | | | 307/104 |

* cited by examiner

DEVICE FOR THE CONTACTLESS CHARGING OF AN ELECTRICAL ENERGY STORAGE MEANS OF A MOTOR VEHICLE

CROSS REFERENCE TO RELATED APPLICATION

This application claims priority under 35 USC 119 to German Patent Appl. No. 10 2015 104 858.2 filed on Mar. 30, 2015, the entire disclosure of which is incorporated herein by reference.

BACKGROUND

1. Field of the Invention

The invention relates to a device for the contactless charging of an electrical energy storage of a motor vehicle, comprising at least one primary coil that can be connected to an electrical power supply system, and a bottom housing, within which the primary coil is arranged. The device is formed so that the primary coil can be flowed through by an alternating current during operation and can generate an alternating magnetic field that can induce an alternating electrical voltage in a secondary coil on the vehicle that is separated from the primary coil by an air gap. As a result, a current flow that is variable over time and can be converted by a rectifier on the vehicle into a direct current for charging the electrical energy storage connected to the rectifier.

2. Description of the Related Art

Alternative drives are playing an increasingly greater role in motor vehicle technology.

The prior art discloses motor vehicles in which the drive comprises an electrical machine or a combination of an electrical machine and an internal combustion engine (known as hybrid electric vehicles). Such motor vehicles have an electrical energy storage for storing electrical energy that is used for feeding the electrical machine.

The electrical energy storage typically has an electrical voltage level in the range between 200 V and 400 V, and has a multiplicity of chargeable battery cells or chargeable blocks of battery cells that are connected to one another.

Various approaches to charging the electrical energy storage are known from the prior art. Charging often is performed with the aid of a charging cable that can be connected to a charging interface of the motor vehicle and to a charging interface of a public power supply system (known as plug-in technology). The charging interfaces of the public power supply system often are standardized sockets, into which a conventional charging plug of the charging cable can be inserted. The charging operation on the public power supply system always requires intervention by the vehicle user, since the charging cable has to be inserted into the charging interfaces provided for it, as a result of which they are subject to wear. Charging of the electrical energy storage of the motor vehicle is not possible if the vehicle user inadvertently leaves the charging cable behind.

Charging stations in areas that are accessible to the public often are damaged by vandalism.

To remedy the aforementioned problems, the prior art has considered using induction for contactlessly charging the energy storage of a motor vehicle. This approach requires two coils. A first or primary coil is accommodated in a bottom housing and is connected to a public power supply system. A second or secondary coil is positioned in the region of an underfloor of the motor vehicle. The primary and the secondary coils must be positioned as exactly as possible over one another for charging the electrical energy storage of the motor vehicle, and consequently must be aligned with one another in the x, y and z directions. The primary coil on the bottom side is flowed through by an alternating electrical current for charging the electrical energy storage means. The primary coil generates an alternating magnetic field that induces an alternating voltage in the secondary coil on the vehicle side, with the consequence of a current flow that is variable over time. A rectifier is provided on the vehicle side to bring about a rectification of the alternating current, so that the electrical energy storage means can be charged.

The distance between the primary and secondary coils in the z direction (vertical direction) can be varied by using a scissor-like lifting device arranged in the bottom housing. The size of an air gap between the primary and secondary coils can be varied in a defined way and set appropriately by raising the primary coil.

Modern motor vehicles often are equipped with a height-adjustable chassis so that at least two different height levels of the motor vehicle can be set. The height-adjustable chassis may for example comprise a height-adjustable air suspension device. WO 2014/114762 A2, WO 2012/079668 A2 and in US 2012/0025761 A1 disclose that the height-adjustable chassis can be lowered before the beginning of the charging process for setting the distance between the bottom-side primary coil and the vehicle-side secondary coil, and consequently setting the size of the air gap. When the device described above is used for the contactless charging of the electrical energy storage of a motor vehicle that has a height-adjustable chassis, the setting of the air gap can be performed according to choice by lowering the height-adjustable chassis or by raising the primary coil with the aid of the lifting device. A combination of the two height adjustments (i.e. lowering the height-adjustable chassis and raising the primary coil by the lifting device) is conceivable in principle. This may be required for example in the case of a motor vehicle with a relatively great ground clearance, such as an off-road vehicle, if the lowering of the motor vehicle by means of the height-adjustable chassis is not sufficient to set the air gap between the primary coil and the secondary coil to the required value.

In principle, the lifting device within the bottom housing may be omitted if the motor vehicle can be lowered by the height-adjustable chassis to the extent that the air gap between the primary and secondary coils can be set to the corresponding value.

The air suspension device on a motor vehicle that has been in service for a relatively long time may sag. Sagging of the air suspension device may cause the motor vehicle to set down on the primary coil and may cause damage to the coils.

An object of the invention is to develop a device for the contactless charging an electrical energy storage of a motor vehicle in a way that prevents damage that may be caused by the motor vehicle setting down on the primary coil.

SUMMARY

A device according to the invention for the contactless charging of an electrical energy storage of a motor vehicle is distinguished by the fact that the at least one primary coil is connected to the bottom housing in such a way as to yield mechanically under the effect of an external compressive force. The invention is based on the idea of connecting the primary coil to the bottom housing not in a rigid manner but in a yielding manner. Avoiding a rigid connection of the primary coil to the bottom housing makes it possible to counteract the problem of a motor vehicle with a height-adjustable chassis that has an air suspension device setting down on the primary coil in such a way that damage may result, if for example the air suspension device sags owing to its time in service. The sagging of the air suspension device causes a pressure to be exerted on the primary coil from above. However, according to the invention, the primary coil is connected to the bottom housing in a yielding manner and is pressed down, so that damage is prevented.

The device may comprise at least one compression spring means that connects the primary coil to the bottom housing to provide a robustly designed yielding connection of the primary coil to the bottom housing.

The at least one compression spring means may extend between a bottom of the bottom housing and the primary coil. The spring force of the compression spring means consequently precisely counteracts the force of the weight of the motor vehicle.

The at least one compression spring may be a helical spring. This allows the at least one compression spring to be mechanically robust.

The at least one compression spring means may be a gas compression spring with a mechanically robust design.

The length of the at least one compression spring means may be chosen so that, in the relaxed state of the compression spring means, the primary coil extends above an upper opening of the bottom housing. When the at least one compression spring means is subjected to a compressive force, the primary coil connected thereto can move into the interior of the bottom housing.

The length of the at least one compression spring means may be chosen so that, in the unloaded state, the primary coil is kept at a distance from the secondary coil in such a way that an air gap forms between the primary coil and the secondary coil at a lower height level of a height-adjustable chassis of the motor vehicle that has at least two height levels. This measure achieves the effect that the air gap between the primary coil and the secondary coil can be adjusted reliably by lowering the height-adjustable chassis.

The device may have a plurality of compression spring means. Thus it is possible to distribute the compressive force acting on the primary coil in the event of setting down of the motor vehicle among a number of compression spring means.

The bottom housing may have an overall height that is chosen so that setting down of the motor vehicle on an upper side of the bottom housing can be prevented in the event of sagging of the motor vehicle. Thus, even in the event of sagging of an air suspension device of a height-adjustable chassis of the motor vehicle owing to its service life, the primary coil yields but the motor vehicle nevertheless will not set down on an upper side of the bottom housing.

Further features and advantages of the invention become clear from the following description of a preferred exemplary embodiment with reference to the accompanying figures.

DETAILED DESCRIPTION

Figure 1:
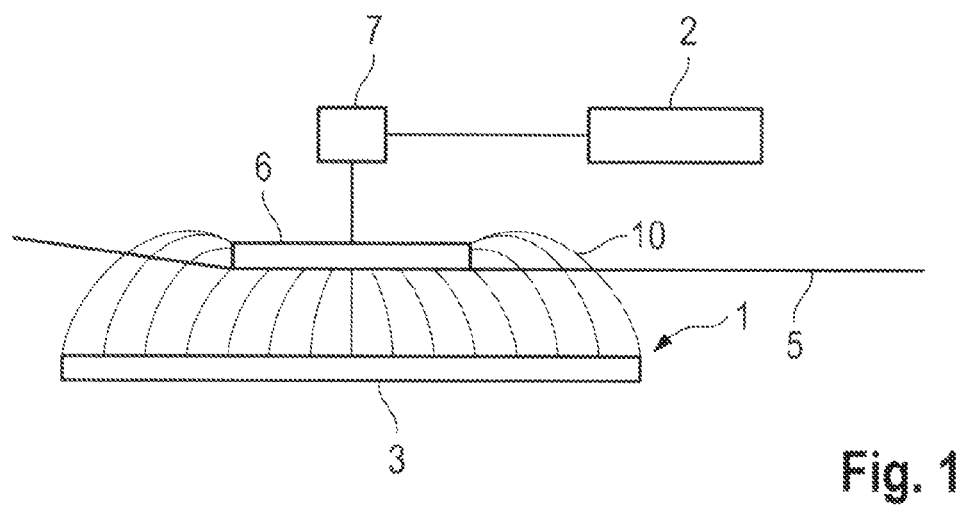
FIG. 1 is a greatly simplified schematic representation of the physical principle of contactless charging of an electrical energy storage of a motor vehicle by induction.
Figure 2:
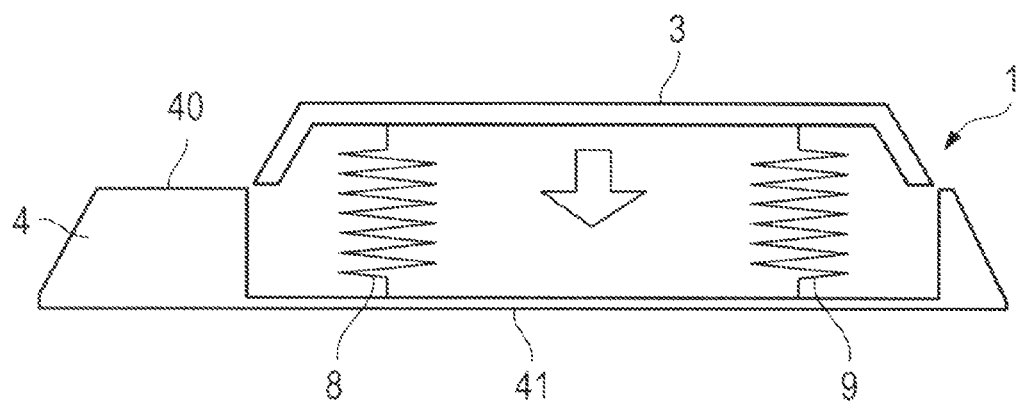
FIG. 2 is a greatly simplified schematic representation of a device for the contactless charging of an electrical energy storage means of a motor vehicle configured according to an embodiment of the invention.

FIG. 1 schematically illustrates a device 1 that embodies the basic physical principle of contactless charging of an electrical energy storage means 2 of a motor vehicle that has as a drive an electrical machine or a combination of an electrical machine and an internal combustion engine (known as a hybrid electric vehicle). The device 1 has a primary coil 3 arranged in a bottom housing 4 that is represented in FIG. 2. The primary coil 3 closes off an upper housing opening of the bottom housing 4.

In the region of an underfloor 5, the motor vehicle has a secondary coil 6 that is connected to a rectifier means 7. The secondary coil 6 and the rectifier means 7 may be enclosed by a common housing. The rectifier means 7 is connected to the electrical energy storage means 2. For charging the electrical energy storage means 2 of the motor vehicle, the primary coil 3 and the secondary coil 6 must be aligned with one another in the x, y and z directions and positioned as exactly as possible one over the other. The primary coil 3 is connected to a public power supply system and is flowed through by an alternating electrical current for charging the electrical energy storage means 2. The primary coil 3 thereby generates an alternating magnetic field 10 that at least partially penetrates through the vehicle-side secondary coil 6 and induces an alternating voltage in it. This alternating voltage results in a current flow that is variable over time. The rectifier means 7 provided on the vehicle side brings about a rectification of the alternating current, so that the electrical energy storage means 2 connected thereto can be charged.

If the motor vehicle is equipped with a height-adjustable chassis that has an air suspension device, there may be the problem that the air suspension device sags if the motor vehicle has been in service for a relatively long time. As a result, the motor vehicle may under some circumstances set down on the primary coil 3 arranged on the bottom side, and thereby cause damage.

To remedy this problem, the bottom housing 4 of the device 1 represented in FIG. 2 for the contactless charging of the electrical energy storage means 2 is designed with respect to its overall height such that the motor vehicle cannot set down on an upper side 40 of the bottom housing 4 in the event of sagging of the air suspension device. Furthermore, the primary coil 3 is not fastened rigidly in the bottom housing 4, but is connected in such a way as to yield under the effect of an external compressive force. In the exemplary embodiment shown here, arranged for this purpose within the bottom housing 4 are two compression spring means 8, 9, that extend between a bottom portion 41 and the primary coil 3. The compression spring means 8, 9 are formed in this exemplary embodiment as helical springs that are arranged at a distance from one another in a longitudinal direction of the bottom housing 4. The compression spring means 8, 9 may also be other types of spring, such as for example by gas compression springs.

Since the bottom housing 4 has a smaller overall height than in the prior art, in the relaxed state of the compression spring means 8, 9 the primary coil 3 extends out of the upper housing opening of the bottom housing 4. The length of the compression spring means 8, 9 is chosen so that, in the relaxed state, the primary coil 3 is at a height level to which the height level of the motor vehicle can be lowered reliably, and without the risk of setting down, by means of the air suspension device of the height-adjustable chassis, while forming an air gap between the primary coil 3 and the secondary coil 6.

Should the air suspension device sag after a relatively long time in service, so that the motor vehicle sets down on the primary coil 3, the compression spring means 8, 9 are compressed. In other words, the primary coil 3 yields as a result of the pressure that has been built up by the motor vehicle and moves down in the axial direction to prevent damage to the primary coil 3 and to the secondary coil 6 on the vehicle.

What is claimed is:

1. A device for a contactless charging of an electrical energy storage of a motor vehicle that has a height adjustable chassis and that is supported on a surface, the motor vehicle further having a secondary coil connected to the electrical energy storage and being held by the vehicle at a specified distance from the surface on which the motor vehicle is supported when the chassis is adjusted to a specified lower position, the device comprising:
    a bottom housing external of the motor vehicle and on the surface that supports the motor vehicle;
    at least one primary coil arranged in the bottom housing and being connectable to an electrical power supply system so that an alternating current flowing through the primary coil generates an alternating magnetic field that can induce an alternating electrical voltage in the secondary coil on the vehicle, with the secondary coil being separated from the primary coil by the specified distance when the chassis is adjusted to the specified lower position, resulting in a current flow that is variable over time and convertible by the rectifier means on the vehicle into a direct current for charging the electrical energy storage connected to the rectifier; and
    at least one compression spring between the primary coil and the bottom housing, the spring, in a relaxed state, positioning the primary coil at the specified distance from the secondary coil when the chassis is adjusted to the specified lower position and yielding mechanically in response to an external compressive force exerted by the secondary coil if the chassis is adjusted to a position lower than the specified position.

2. The device of claim 1, wherein the at least one compression spring is a helical spring.

3. The device of claim 1, wherein the at least one compression spring is a gas compression spring.

4. The device of claim 1, wherein a length of the at least one compression spring is chosen so that, in the relaxed state of the at least one compression spring, the primary coil extends above an upper housing opening of the bottom housing.

5. The device of claim 4, wherein the length of the at least one compression spring is chosen so that, in the relaxed state of the at least one compression spring, the primary coil is kept at a distance from the secondary coil so that an air gap forms between the primary coil and the secondary coil at the specified lower position of the height-adjustable chassis of the motor vehicle that has at least two height levels.

6. The device of claim 1, wherein the at least one compression spring comprises a plurality of the compression springs.

7. The device of claim 1, wherein the bottom housing has an overall height selected so that setting down of the motor vehicle on an upper side of the bottom housing is prevented in the event of sagging of the motor vehicle.

\* \* \* \* \*